(12) United States Patent
    Somanath

(10) Patent No.: US 11,804,129 B2
(45) Date of Patent: Oct. 31, 2023

(54) SYSTEMS AND METHODS TO DETECT STALKING OF AN INDIVIDUAL WHO IS TRAVELING IN A CONNECTED VEHICLE

(71) Applicant: Ford Global Technologies, LLC, Dearborn, MI (US)

(72) Inventor: Nithya Somanath, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 17/495,529

(22) Filed: Oct. 6, 2021

(65) Prior Publication Data

US 2023/0103588 A1    Apr. 6, 2023

(51) Int. Cl.
    *G08G 1/01*    (2006.01)

(52) U.S. Cl.
    CPC .............. *G08G 1/0141* (2013.01); *G08G 1/0129* (2013.01)

(58) Field of Classification Search
    CPC ............................ G08G 1/0141; G08G 1/0129
    USPC .................................................. 340/901.000
    See application file for complete search history.

(56) References Cited

U.S. PATENT DOCUMENTS

| 8,854,465 | B1* | 10/2014 | McIntyre | ........... | B60R 25/1004 |
|---|---|---|---|---|---|
| | | | | | 348/148 |
| 9,503,860 | B1* | 11/2016 | Mankovskii et al. | . | H04W 4/023 |
| 10,796,248 | B2 | 10/2020 | Liu et al. | | |
| 2007/0299596 | A1* | 12/2007 | Moritz et al. | ............ | G06T 7/80 |
| | | | | | 348/148 |
| 2008/0094230 | A1* | 4/2008 | Mock et al. | ........... | G08B 21/22 |
| | | | | | 340/539.13 |
| 2011/0025846 | A1* | 2/2011 | Garrett | .................... | H04N 7/18 |
| | | | | | 348/207.1 |
| 2012/0296560 | A1* | 11/2012 | Zheng et al. | ........ | G08G 1/0112 |
| | | | | | 701/119 |
| 2013/0096731 | A1* | 4/2013 | Tamari et al. | ...... | G06F 11/3058 |
| | | | | | 701/1 |

(Continued)

OTHER PUBLICATIONS

Arthur D. Little, "Rethinking On-Demand Mobility Turning Roadblocks Into Opportunities", Travel & Transportation Global, Jan. 2020, 27 pages.

*Primary Examiner* — Kerri L McNally
*Assistant Examiner* — Thang D Tran
(74) *Attorney, Agent, or Firm* — Brandon Hicks; Eversheds Sutherland (US) LLP

(57) ABSTRACT

This disclosure is generally directed to detecting stalking of an individual who is traveling in a connected vehicle. In an example method, a first individual traveling in a first connected vehicle may enter into a personal device (a smartphone, for example), a request to perform a surveillance operation. The personal device may respond to the request by communicating with a cloud computer. The personal device and/or the cloud computer may obtain data from a vehicle computer of the first connected vehicle and/or from a vehicle computer of a second connected vehicle and evaluate the data to detect a travel pattern of a second individual traveling in either the first connected vehicle or the second connected vehicle. The travel pattern of the second individual is then evaluated to determine whether the second individual is stalking the first individual. A report of the surveillance procedure may be provided to the first individual.

11 Claims, 7 Drawing Sheets

(56) References Cited

U.S. PATENT DOCUMENTS

| | | | |
|---|---|---|---|
| 2016/0132705 A1* | 5/2016 | Kovarik et al. | G05D 1/0261 |
| | | | 340/10.3 |
| 2016/0321566 A1* | 11/2016 | Liu et al. | G05D 1/0011 |
| 2016/0364812 A1* | 12/2016 | Cao | G06Q 50/30 |
| 2018/0189717 A1* | 7/2018 | Cao | G06Q 50/30 |
| 2018/0195874 A1* | 7/2018 | Andrew et al. | G01C 21/3679 |
| 2018/0262724 A1* | 9/2018 | Ross | H04N 7/188 |
| 2019/0143967 A1* | 5/2019 | Kutila et al. | B60W 50/14 |
| | | | 701/23 |
| 2020/0051021 A1* | 2/2020 | Ohtani et al. | G06Q 10/08355 |
| 2020/0057453 A1* | 2/2020 | Laws et al. | B60W 30/18 |
| 2020/0082287 A1* | 3/2020 | Beaurepaire et al. | G06N 5/047 |
| 2020/0098009 A1* | 3/2020 | Takemura et al. | G09F 27/00 |
| 2020/0137351 A1* | 4/2020 | Bai et al. | G06V 20/56 |
| 2020/0160715 A1* | 5/2020 | Kusama et al. | G06V 40/103 |
| 2020/0164891 A1* | 5/2020 | Bender et al. | B60W 50/0098 |
| 2020/0312063 A1* | 10/2020 | Balakrishnan et al. | |
| | | | G08B 13/19697 |
| 2020/0349666 A1* | 11/2020 | Hodge et al. | G08G 1/017 |
| 2020/0356100 A1* | 11/2020 | Nagarajan et al. | G01C 21/3602 |
| 2020/0393835 A1* | 12/2020 | Gregg et al. | G01C 21/3438 |
| 2021/0029239 A1* | 1/2021 | Davis | G06Q 50/30 |
| 2021/0042668 A1* | 2/2021 | Gao et al. | G06Q 10/02 |
| 2021/0074155 A1* | 3/2021 | Lassoued et al. | G05D 1/0094 |
| 2021/0078621 A1* | 3/2021 | Garmson | G08G 1/017 |
| 2021/0223051 A1* | 7/2021 | Hochberg et al. | G06Q 10/0631 |
| 2021/0300418 A1* | 9/2021 | Alvarez et al. | G08G 1/161 |
| 2022/0048432 A1* | 2/2022 | Switalski et al. | G08G 1/166 |
| 2022/0089190 A1* | 3/2022 | Pendleton | G08G 1/04 |
| 2022/0114879 A1* | 4/2022 | Larsen et al. | B60Q 1/509 |

\* cited by examiner

SYSTEMS AND METHODS TO DETECT STALKING OF AN INDIVIDUAL WHO IS TRAVELING IN A CONNECTED VEHICLE

BACKGROUND

A person with malignant intent may stalk his/her victim before perpetrating a crime. In some scenarios, the victim may become aware of the stalking and fail to respond properly to the situation. In some other scenarios, the victim may either be unaware of the stalking or may suspect someone without a proper basis for doing so. It would be desirable to obtain information that would provide a confirmation that a person is being stalked, particularly when the person is traveling in a vehicle either alone or with a stranger.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
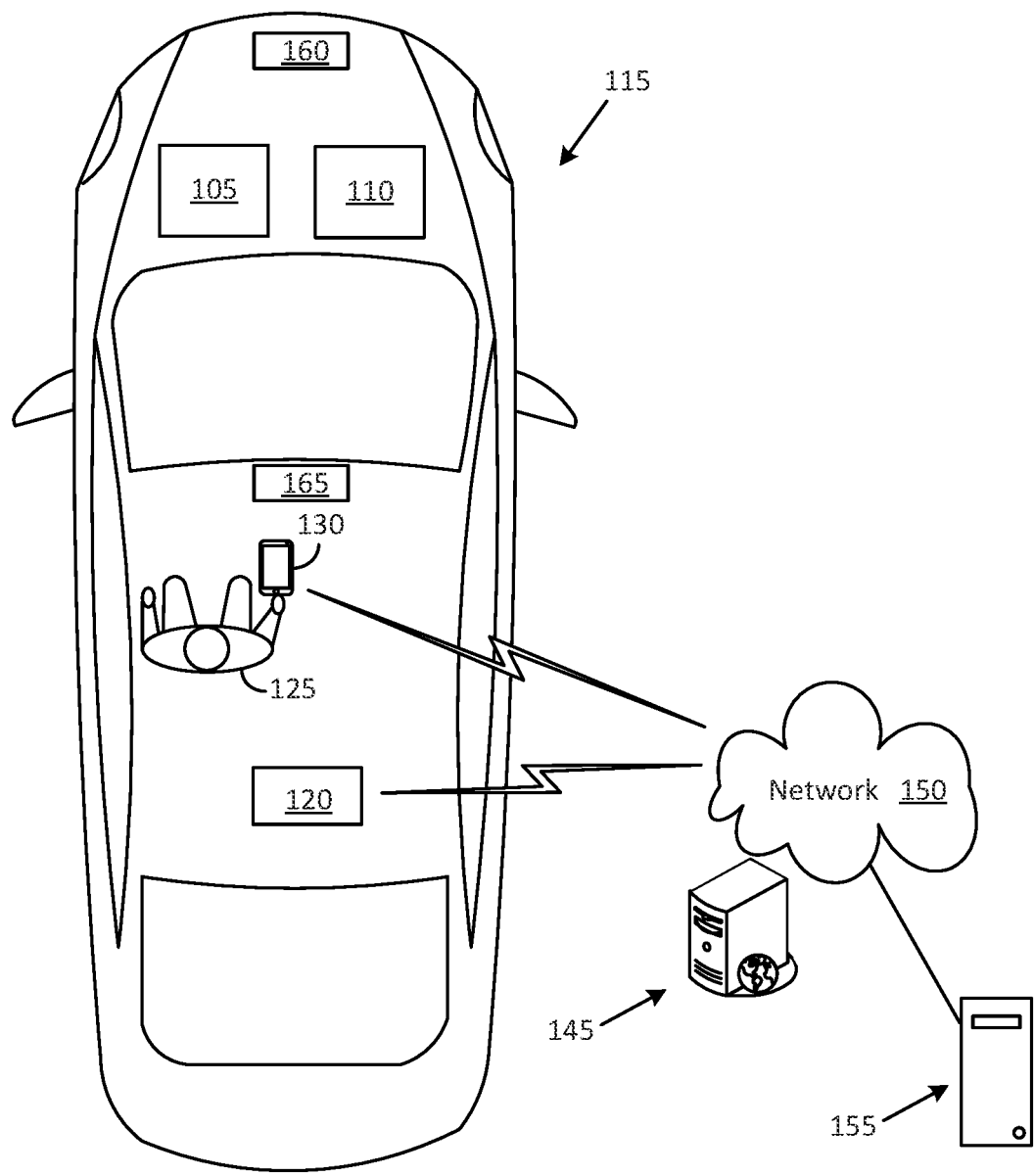
FIG. 1 illustrates an example vehicle that is configured to support a surveillance operation in accordance with an embodiment of the disclosure when requested by an occupant of the vehicle.

In terms of a general overview, certain embodiments described in this disclosure are directed to systems and methods to detect stalking of an individual who is traveling in a connected vehicle. In an example method, a first individual traveling in a first connected vehicle may enter into a personal device (a smartphone, for example), a request to perform a surveillance operation. A processor in the personal device may respond to the request by communicating with a cloud computer. The processor in the personal device and/or a processor in the cloud computer may obtain data from a vehicle computer of the first connected vehicle and/or from a vehicle computer of a second connected vehicle and evaluate the data to detect a travel pattern of a second individual traveling in either the first connected vehicle or the second connected vehicle. The travel pattern of the second individual, which can include a travel history of the second individual in the first connected vehicle and/or the second connected vehicle, is evaluated to determine whether the second individual is stalking the first individual. A report is then provided to the first individual.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "vehicle" as used herein encompasses various types of vehicles such as, for example, a car, a truck, a van, a sports utility vehicle (SUV), a drone and a bus. The phrase "connected vehicle" as used in this disclosure refers to any type of vehicle that can communicate data to, and/or receive data from, other vehicles and objects (infrastructure objects, for example). the communication may be carried out via a wireless communication system such as, for example a vehicle-to-vehicle (V2V) communication system, and/or through a network that supports wireless communications such as, for example, the Internet. The phrase "autonomous vehicle" as used in this disclosure generally refers to a vehicle that includes automation for performing at least a few operations without human intervention. The described embodiments are applicable to vehicles having any of various levels of automation, such as the six levels defined by the Society of Automotive Engineers (SAE). The six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain operations executed by the vehicle computer. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment failures. The level of human intervention is very low. Level 5 (L5) vehicles are fully autonomous vehicles that do not involve human participation.

Words such as "wireless" or "wirelessly" as used herein are not intended to preclude other forms of communication such as optical communications and wired communications. The examples provided herein encompass such alternative communication technologies. Word such as "data" and "information" may be used interchangeably and generally refers to various types of content carried through a communication medium (wired/wireless). Furthermore, it should be understood that words such as "implementation," "application," "scenario," "case," and "situation" as used herein are an abbreviated version of the phrase "In an example ("implementation," "application," "scenario," "case," "situation") in accordance with the disclosure." It should also be understood that the word "example" as used herein is intended to be non-exclusionary and non-limiting in nature.

FIG. 1 illustrates an example vehicle 115 that is configured to support a surveillance operation in accordance with an embodiment of the disclosure when requested by an occupant of the vehicle 115. The vehicle 115 may be any type of vehicle such as, for example, a gasoline powered vehicle, an electric vehicle, a hybrid electric vehicle, a drone, or an autonomous vehicle, that is configured to operate as a connected vehicle. In an example embodiment, the vehicle 115 is a ride share vehicle that is operated by a ride share service provider such as, for example, Uber® or Lyft®. In some implementations, the vehicle 115 is an autonomous vehicle that may be owned/leased for use by an individual or owned and operated by a ride share service provider.

In the illustrated example, the vehicle 115 includes a vehicle computer 110 and a surveillance system 105 that are configured to, independently or cooperatively, transfer data (receive and/or transmit) with other vehicles and any of various types of objects located inside or outside the vehicle 115. The example vehicle 115 further includes an infotainment system 165, a sensor system 160, and a wireless communication system 120. In the illustrated example, the vehicle 115 contains an occupant (a driver or a passenger) who is generally referred to hereinafter as an individual 125. The individual 125 may carry a personal device 130, which can be, for example, a smartphone, a wearable computer, a tablet computer, or a laptop computer.

The vehicle computer 110 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). The vehicle computer 110 may be communicatively coupled to the surveillance system 105 for performing certain operations under advice and/or control of the surveillance system 105. Such an arrangement is particularly relevant when the vehicle 115 is an autonomous vehicle.

The infotainment system 165 can be an integrated unit that includes various components such as a radio, streaming audio solutions, and USB access ports for digital audio devices, with elements such as a navigation system that provides navigation instructions to a driver of the car. In an example implementation, the infotainment system 165 has a display that includes a graphical user interface (GUI) for use by the individual 125. The GUI may be used for various purposes such as, for example, to input a request to perform a surveillance operation to detect a stalker in accordance with the disclosure. The display may also be used to display messages and alerts to the driver of the vehicle 115 such as, for example, an alert regarding a stalker.

The personal device 130 carried by the individual 125 can also include a GUI and a display that can be used in the same manner as described above with respect to the infotainment system 165. A surveillance operation may be initiated and/or executed by a software application that is downloadable into the personal device 130. In one example embodiment, the personal device 130 may respond to a request for surveillance by obtaining data from one or more sources and evaluating the data to identify a travel pattern of another individual (a potential stalker) who may be traveling along with the individual 125 in the vehicle 115 or may be traveling in another vehicle (not shown) that may be shadowing the vehicle 115. The data may be obtained from sources such as, for example, a database of the vehicle computer 110, a database of the surveillance system 105, and/or a database of a surveillance system in another vehicle. The travel pattern identified from the travel data may be evaluated by the software application in the personal device 130 for determining whether the other individual is stalking the individual 125.

In another example embodiment, the infotainment system 165 may propagate to the surveillance system 105, the request for the surveillance operation made by the individual 125. The surveillance system 105 may respond to the request by obtaining data from one or more sources and evaluating the data to identify a travel pattern of another individual (a potential stalker) who may be traveling along with the individual 125 in the vehicle 115 or may be traveling in another vehicle (not shown) that may be shadowing the vehicle 115. The data may be obtained from sources such as, for example, a database of the vehicle computer 110, a database of the surveillance system 105, and/or a database of a surveillance system in another vehicle. The travel pattern identified from the travel data may be evaluated by the surveillance system 105 for determining whether the other individual is stalking the individual 125.

The sensor system 160 can include various types of sensors and detectors that may provide data about various objects located outside the vehicle 115 in accordance with various embodiments of the disclosure. The sensors and detectors may be installed at various locations in the vehicle 115 and can include, for example, one or more cameras, ultrasonic sensors, radar devices, sonar devices, light detection and ranging (LIDAR) devices, and audio detectors (microphones). In an example application, a camera is mounted on a front portion of the vehicle 115 (bumper, grille, dashboard, etc.) and arranged to capture images of objects located in front of the vehicle 115. The objects can include, for example, another vehicle that is shadowing the vehicle 115. A radar device may be arranged to capture information (distance, speed, location, etc.) of various objects such as, for example, another vehicle that is shadowing the vehicle 115. In some cases, a sonar device or a LIDAR device may be used in place of, or in addition to, the radar device.

The wireless communication system 120 can include multiple wireless nodes mounted at various locations on the vehicle 115 or a single integrated unit that is mounted for example, in an engine compartment of the vehicle 115, in a trunk of the vehicle 115, in a cabin of the vehicle 115, or on the roof of the vehicle 115 (as shown). The wireless communication system 120 can be configured to use one or more of various communication technologies to allow the surveillance system 105 and the vehicle computer 110 to communicate with devices such as, for example, a cloud computer 145 and/or a server computer 155.

The network 150 may include any one, or a combination of networks, such as, for example, a local area network (LAN), a wide area network (WAN), a telephone network, a cellular network, a cable network, a wireless network, and/or private/public networks such as the Internet. The network 150 may support communication technologies such as, for example, Bluetooth®, cellular, near-field communication (NFC), Ultra-Wideband (UWB), Wi-Fi, Wi-Fi direct, machine-to-machine communication, and/or man-to-machine communication. At least one portion of the network 150 includes a wireless communication link that allows the cloud computer 145 to communicate with the surveillance system 105 via the wireless communication system 120 of the vehicle 115.

The surveillance system 105 may operate independently or in cooperation with the vehicle computer 110 to communicate information with other devices, either directly or via the network 150. The surveillance system 105 can include a computer having a processor and a memory. The memory, which is one example of a non-transitory computer-readable medium, may be used to store various code modules. The code modules, which may be provided in the form of software package containing computer-executable instructions that can be executed by the processor for performing various operations in accordance with the disclosure. A few examples of such operations, which are generally directed at detecting a person who may be stalking the individual 125.

The cloud computer 145 and/or the server computer 155 may include content that is accessible by the surveillance system 105 such as, for example, a software package that is downloadable into the surveillance system 105, information associated with travel by one or more other individuals (origination locations, destination locations, times of travel, payment information, frequency of travel etc.)

Figure 2:
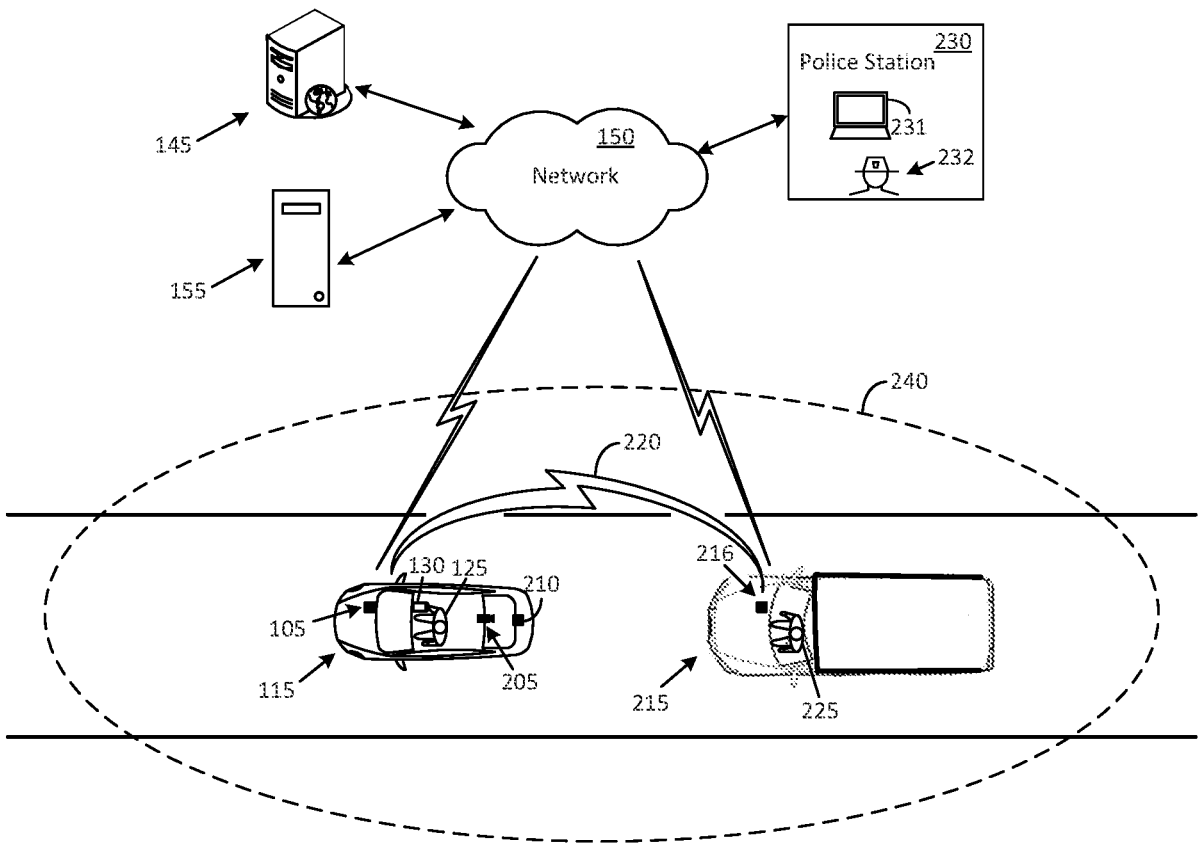
FIG. 2 illustrates an example scenario where an occupant of a first connected vehicle is being stalked by an individual traveling in a second connected vehicle.

FIG. 2 illustrates an example scenario where the individual 125 who is riding in the vehicle 115 may be stalked by an individual 225 riding in another vehicle 215. The vehicle 215 may be any type of vehicle (such as, for example, a gasoline powered vehicle, an electric vehicle, a hybrid electric vehicle, or an autonomous vehicle) that is configured to operate as a connected vehicle. In an example embodiment, the vehicle 215 is a ride share vehicle that is operated by a ride share service provider such as, for example, Uber® or Lyft®. In some implementations, the vehicle 215 is an autonomous vehicle that may be owned/leased by an individual or may be owned and operated by a ride share service provider. In the illustrated scenario, an individual 225 is traveling in the vehicle 215 that is behind the vehicle 115. The individual 225 may, or may not, be stalking the individual 125 traveling in the vehicle 115.

In an example embodiment, the individual 125 may enter a request to perform a surveillance operation to detect any person who may be stalking the individual 125 either by traveling in the same vehicle (vehicle 115), or in another vehicle. In one case, the request may be made prior to the individual 125 getting into the vehicle 115. In another case, the request may be made after the individual 125 has entered the vehicle 115. The individual 125 may be any of various types of people such as, for example, a minor who is making the request based on instructions received from a parent, an unaccompanied adult who is traveling in the vehicle 115 late at night, or a person who is traveling in a driver-less vehicle (when the vehicle 115 is an autonomous vehicle).

In a first example implementation, the surveillance system 105 may respond to the request by defining a geofence 240 around the vehicle 115. In another example implementation, the surveillance system 105 may perform operations such as the ones described below, without implementing or using a geofence. The geofence 240 can be a dynamic geofence that moves along with the vehicle 115 and is shaped in the form of an oval in this example implementation. In other implementations, the geofence 240 can have various other shapes such as, for example, a circular shape, a rectangular shape, a polygonal shape, or an irregular shape. The shapes can extend in various directions with respect to the vehicle 115 such as, for example, an elongated shape that extends to a greater distance behind the vehicle 115 than towards the front of the vehicle 115.

The dimensions of the geofence 240 may be defined by various entities such as, for example, the individual 125, a manufacturer of the vehicle 115, or a dealership that sells the vehicle 115. In an example scenario, the individual 125 of the vehicle 115 may specify a dimension of the geofence 240 via the GUI of the infotainment system 165. The dimension may be defined, for example, on the basis of a personal comfort level of the individual 125. In one case, the individual 125 may specify the dimension on the basis of a single vehicle-to-vehicle separation distance between the vehicle 115 and another vehicle that may be following the vehicle 115. In another case, the individual 125 may specify the dimension on the basis of a multi vehicle-to-vehicle separation distance. The multi vehicle-to-vehicle separation distance can correspond to a separation distance between the vehicle 115 and another vehicle that is attempting to stalk the vehicle 115 by hiding behind an intervening vehicle. In another example scenario, a dimension of the geofence 240 may be defined on the basis of an operating range of a detection device such as, for example, the ultrasonic detector 210 or a LIDAR device. The surveillance system 105 may use the input provided via the GUI of the infotainment system 165 and/or based on operating parameters of one or more detection devices to define, implement, and maintain the geofence 240.

In the illustrated example scenario, a sensor of the sensor system 160, such as, for example, a camera 205 or an ultrasonic detector 210 detects the presence of the vehicle 215 inside the geofence 240. In an example sequence of events, the ultrasonic detector 210 then transmits a trigger signal to the camera 205 to capture an image and/or a video clip of the vehicle 215. The image and/or a video clip may be propagated by the camera 205 to the surveillance system 105. In another implementation, the individual 125 may initiate image capture by the camera 205 after watching the vehicle 215 in his/her rear-view mirror and becoming suspicious.

The surveillance system 105 may evaluate the images and/or video clip captured by the camera 205 to determine whether the individual 225 in the vehicle 215 is stalking the individual 125 in the vehicle 115. In an example procedure for evaluating the images and/or video clip, the surveillance system 105 may evaluate images (and/or video clips) that have been previously stored in a memory of the surveillance system 105 in order to determine whether the vehicle 215 is present in any of the previously stored images. If present, the surveillance system 105 may evaluate timing information and location information associated with the previously stored images in comparison to the currently captured images so as to identify a behavioral pattern of the vehicle 215. In another example procedure, the surveillance system 105 may obtain information in real time from the cloud computer 145 and/or the server computer 155 (via the network 150). In one case, the information can include an evaluation and/or analysis of the actions being carried out by the individual 225.

In an example scenario, the evaluation may indicate to the surveillance system 105 that the behavioral pattern of the vehicle 215 appears suspicious. Consequently, the surveillance system 105 may perform one or more actions to obtain information about the individual 225. An example action involves the surveillance system 105 establishing communications with a computer 216 of the vehicle 215 via, for example, a vehicle-to-vehicle (V2V) wireless communication link 220. Upon establishing communications, the surveillance system 105 may request, and receive, from the computer 216, information about an identity of the vehicle 215, such as, for example, a vehicle identification number (VIN) and an identity of an owner of the vehicle 215.

The surveillance system 105 may, either independently, or in cooperation with cloud computer 145, determine if the VIN number of the vehicle 215 matches any of a set of VIN numbers that may be stored in the memory of the surveillance system 105 on the basis of previous encounters with the vehicle 215, or as a part of a vehicle directory. In an example scenario, a match may be found. The surveillance system 105 and/or the cloud computer 145 may them evaluate information pertaining to a travel pattern of the vehicle 215, which in turn may provide information about a travel pattern of the individual 225. The travel pattern of the vehicle 215 can include a travel pattern of the vehicle 215 over a current period of time when the individual 125 is taking a ride in the vehicle 115 and/or during other periods of time in the past when the individual 125 traveled in the vehicle 115. Some examples of travel patterns are described below. Evaluating the travel pattern of the vehicle 215 may provide an indication whether the individual 225 is stalking the individual 125.

The surveillance system 105 and/or the cloud computer 145 may also evaluate information pertaining to the individual 225, such as, for example, a criminal history of the individual 225 and a travel pattern of the individual 225. The travel pattern is particularly relevant when the vehicle 215 is a rental vehicle offered by a rental agency such as Hertz®, for example, or a ride share vehicle operated by a ride share company such as Uber® or Lyft®. Travel data such as, for example, travel times, travel frequency, travel routes, number trips taken, and/or payments made by the individual 225, may be evaluated in order to identify any similarities with travel data associated with the individual 125. The presence of similarities can provide an indication that the individual 225 is stalking the individual 125.

The surveillance system 105 may then present a result of the surveillance information to the individual 125 for examination and further action. The result can include an identity of the individual 225. In one scenario, the individual 125 may identify the individual 225 as a friend, a colleague, a neighbor, or a family member who poses no threat to the individual 125. In this case, the individual 125 may provide an instruction to the surveillance system 105 to place the individual 225 on a friends list or a family list and desist from performing surveillance operations upon the individual 225.

In another example scenario, the individual 125 may be unable to identify the individual 225 or may recognize that the individual 225 appears to pose a threat to the individual 125. In this case, the individual 125 may seek guidance from the surveillance system 105. The surveillance system 105 may respond to the request in one or more ways. In one situation, the surveillance system may automatically communicate with a computer 231 in a police station 230 to alert a police officer 232 of a security threat posed by the individual 225. The communication sent to the computer 231 may take various forms such as, for example, in the form of a request for a police vehicle to be dispatched to a current location of the vehicle 115, or in the form of a formal complaint. In another implementation, the communication sent to the computer 231 may include an image of the individual 225, an image of the vehicle 215, a video clip of the vehicle 215 following the vehicle 115, and/or a real-time video of the vehicle 215 following the vehicle 115. In some cases, the surveillance system 105 may propagate the image or video to the network 150 for cloud storage and access by various entities in addition to the police officer 232 such as, for example, a friend or a family member.

The surveillance system 105 may then inform the individual 125 of the vehicle 115 (via the infotainment system 165 and/or the personal device 130) of the communication having been sent to the computer 231 in the police station 230. The individual 125 may then watch out for the arrival of a police vehicle. In some cases, the police officer 232 may contact the individual 125 via the personal device 130 to advise the individual 125 of an action plan to be followed, such as, for example, to drive to the police station 230 or to a rendezvous location with a police vehicle. In some other case, the surveillance system 105 may provide to the individual 125, one or more options to take evasive action to counter the stalking operation in the future. Such action may include, for example, switching from a ride share service provider that is being currently used by the individual 125 to a different ride share service provider, modifying a travel route, modifying a travel time, and/or modifying a length of time during which the surveillance operation is conducted (for example, extending the surveillance operation beyond a first period of time that corresponds to a trip).

Figure 3:
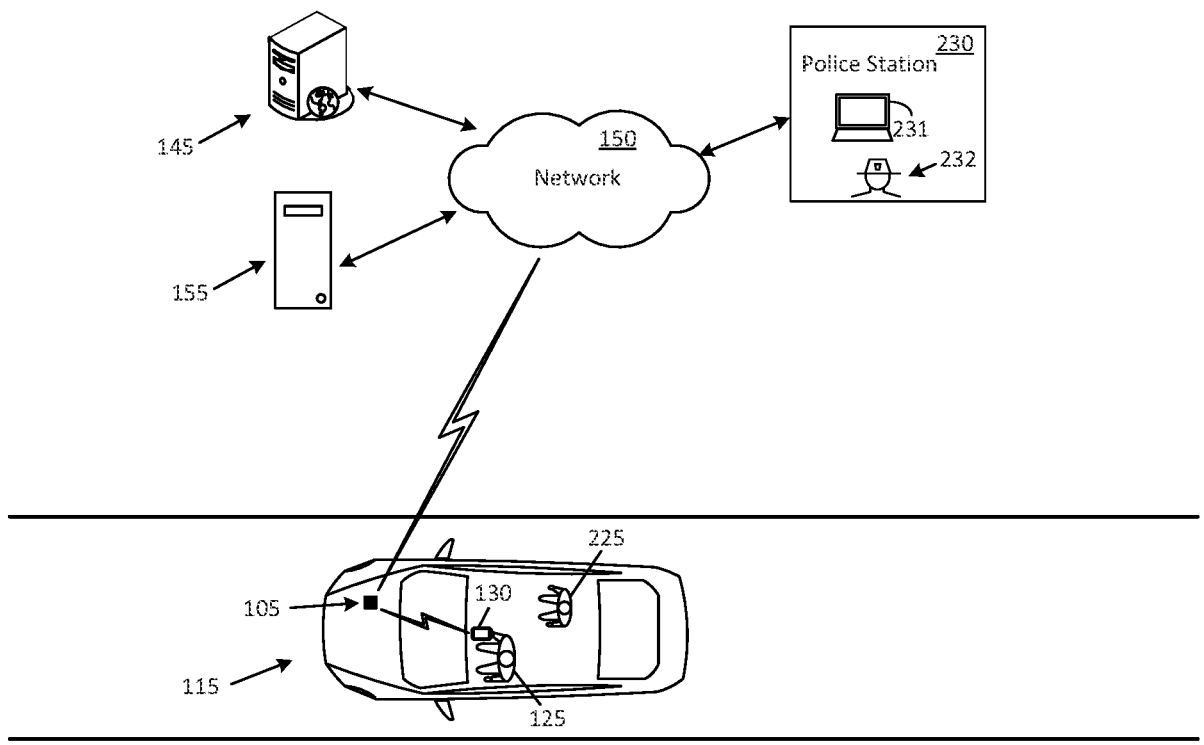
FIG. 3 illustrates another example scenario where an occupant of a connected vehicle is being stalked by an individual traveling in the same connected vehicle.

FIG. 3 illustrates another example scenario where the individual 125 who is riding in the vehicle 115 may be stalked by the individual 225 traveling in the same vehicle 115. In this example scenario, the vehicle 115 can be an autonomous ride share vehicle and the individual 125 may harbor a suspicion that he/she is being stalked by the individual 225 who is sharing a ride in the autonomous ride share vehicle. Based on the suspicion, the individual 125 may enter a request into the personal device to perform a surveillance operation to determine whether the individual 225 is indeed a stalker.

In one example implementation, the request is transmitted to the surveillance system 105, which executes the surveillance operation by obtaining data about the individual 225 from sources such as, for example, the vehicle computer 110, the cloud computer 145, and/or the server computer 155. More particularly, the data about the individual 225 can be a travel history of the individual 225 in the vehicle 115. The surveillance system 105 may then evaluate the travel history to identify a travel pattern of the individual 225. The surveillance system 105 may also obtain travel data of the individual 125 and compare the travel data of the individual 125 to the travel data of the individual 225 in order to identify a similarity, an overlap, and/or a suspicious pattern that would indicate a stalking operation. For example, the comparison may indicate that the individual 225 hailed and traveled in the vehicle 115 at the same instances as the individual 125 over a period of time (a few weeks or months, for example). The comparison may also indicate that factors such as, for example, trip origination spots (a residential area, for example), trip destination spots (a shopping mall, for example), and/or trip times (random times, late evening, for example) of the travel pattern of the individual 225 in the vehicle 115 do not reflect a harmless operation such as, for example, a daily commute to a work place, and may instead indicate that the individual 225 is stalking the individual 125.

The surveillance system 105 may inform the individual 125 of the results of the surveillance operation. If the individual 225 is stalking the individual 125, the surveillance system 105 may also provide advice that the individual 125 can follow at a current instant in time such as, for example, to exit the vehicle 115 and hail another ride share vehicle or taxi, call a friend or family member to alert them of the stalker, and/or send a text message to the police. The surveillance system 105 may also provide advice that the individual 125 can follow in the future such as, for example, switching from the ride share service provider that is being currently used by the individual 125 to a different ride share service provider, modifying a travel route, modifying a travel time, and/or modifying a length of time during which the surveillance operation is conducted (for example, extending the surveillance operation beyond a first period of time that corresponds to a trip).

In some situations, the surveillance system 105 may indicate that the individual 225 is not a stalker if the surveillance procedure does not find any indication of stalking. The individual 125 may, in some cases, decide to extend the surveillance and may instruct the surveillance system 105 to automatically execute a surveillance operation each time the individual 125 enters a ride share vehicle going forward. The surveillance system 105 may then execute a surveillance operation when the individual 125 uses a ride share service. In various implementations, the surveillance operation may be automatically executed repetitively, periodically, intermittently, or on a random basis.

In another example implementation, the individual 125 may enter a request into the personal device 130 to perform a surveillance operation to determine whether the individual 225 is a stalker. The request may be transmitted directly to the cloud computer 145, which may then execute the surveillance operation in the manner described above (determining travel pattern, comparing travel pattern, etc.). The cloud computer 145 can interact with the individual 125 via the personal device 130 for purposes such as, for example, to provide a result of the surveillance operation and/or to provide advice for taking evasive action.

Figure 4:
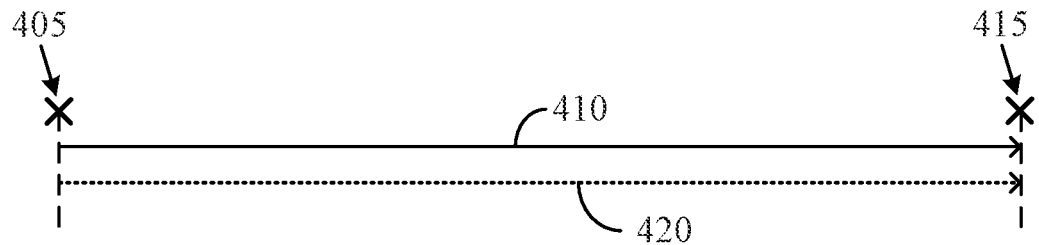
FIG. 4 illustrates a first example travel route that a stalker may follow in a second connected vehicle when stalking an occupant of a first connected vehicle.

FIG. 4 illustrates a first example travel route that a stalker may follow in a first connected vehicle or a second connected vehicle when stalking an occupant of the first connected vehicle. In this example scenario, the individual 225 may travel in the first connected vehicle 115 or a second vehicle, such as, for example, the vehicle 215, from an origination spot 405 at which the individual 125 begins his/her ride in the vehicle 115 and may travel to a destination spot 415 where the individual 225 exits his/her vehicle 115. The travel route of the individual 225, who can be a stalker, is indicated in the form of a dashed line 420 that mirrors the travel route of the individual 125, which is indicated in the form of a solid line 410.

Figure 5:
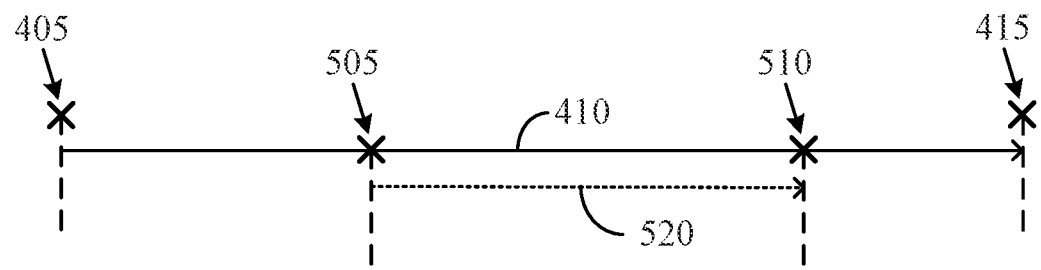
FIG. 5 illustrates a second example travel route that a stalker may follow in a second connected vehicle when stalking an occupant of a first connected vehicle.

FIG. 5 illustrates a second example travel route in a scenario where a stalker travels in the same vehicle as the victim. In this example scenario, the individual 125, who is the victim, is traveling in the vehicle 115 and the individual 225, who is the stalker, may enter the vehicle 115 at a first intermediate spot 505 along the travel route and exit the vehicle 115 at a second intermediate spot 510 along the travel route. The individual 225 may opt to travel on this travel route segment (shown in the form of a dashed line 520) in order to avoid raising suspicion of his/her stalking activity. The surveillance system 105 and/or the cloud computer 145 may analyze the travel pattern of the individual 225 and recognize a partial overlap between the travel route of the individual 225 and the travel route of the individual 125 on more than one occasion. The surveillance system 105 may then evaluate other factors such as, for example, travel times, travel frequency, and personal information of the individual 225 to determine if the individual 225 is stalking the individual 125. Personal information such as address, family details, and past history (changes in residence, for example) may be obtained from public records and other sources.

Figure 6:
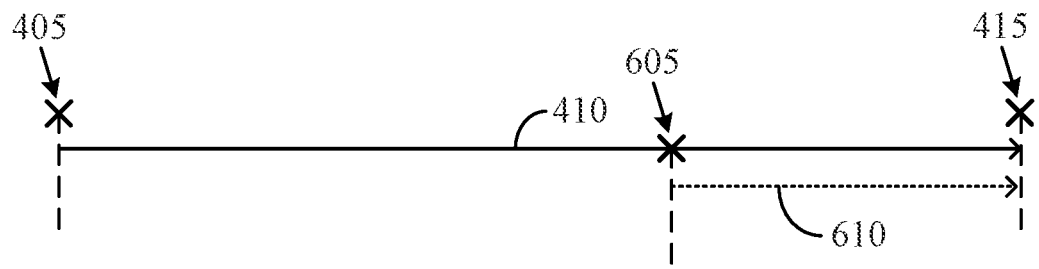
FIG. 6 illustrates a third example travel route that a stalker may follow in a second connected vehicle when stalking an occupant of a first connected vehicle.

FIG. 6 illustrates a third example travel route in another scenario where a stalker travels in the same vehicle as the victim. In this example scenario, the individual 225 may enter the vehicle 115 at an intermediate spot 605 along the travel route and exit the vehicle 115 at the destination spot 415 where the individual 125 exits the vehicle 115. The individual 225 may opt to take this travel route (shown in the form of a dashed line 610) in order to avoid raising suspicion of his/her stalking activity. The surveillance system 105 and/or the cloud computer 145 may analyze the travel pattern of the individual 225 and recognize a partial overlap between the travel route of the individual 225 and the travel route of the individual 125 on more than one occasion. The surveillance system 105 may then evaluate other factors such as, for example, travel times, travel frequency, and personal information of the individual 225 to determine if the individual 225 is stalking the individual 125.

Figure 7:
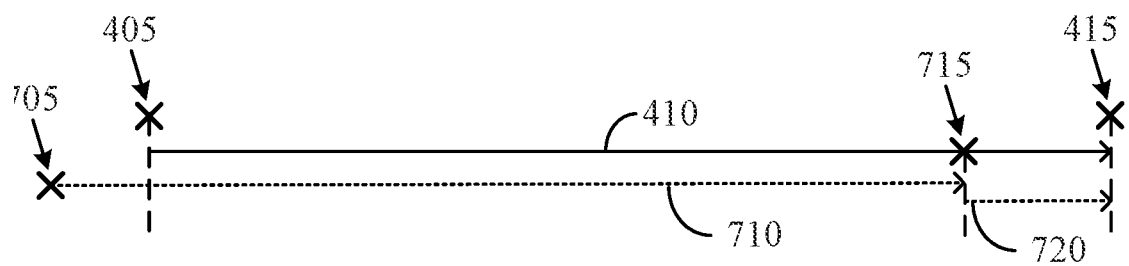
FIG. 7 illustrates a fourth example travel route that a stalker may follow in a second connected vehicle when stalking an occupant of a first connected vehicle.

FIG. 7 illustrates a fourth example travel route that a stalker may follow in a second connected vehicle when stalking an occupant of a first connected vehicle. In this example scenario, the individual 225 may enter the second vehicle at a spot 705 located ahead of the origination spot 405 at which the individual 125 begins his/her ride in the vehicle 115 and may exit the second vehicle at a spot 715 that is ahead of the destination spot 415 where the individual 225 exits his/her vehicle 115. This travel route segment is shown in the form of a dashed line 710. The individual 225 may then travel in a third vehicle along a travel route indicated in the form of a dashed line 720, from the spot 715 to the destination spot 415 where the individual 225 exits his/her vehicle 115. The individual 225 may opt to take this multiple travel approach in order to avoid raising suspicion of his/her stalking activity. The surveillance system 105 and/or the cloud computer 145 may analyze the travel pattern of the individual 225 and recognize two partial overlaps between the travel route of the individual 225 and the travel route of the individual 125. The surveillance system 105 may then evaluate other factors such as, for example, travel times of the individual 225 to determine if the individual 225 is stalking the individual 125.

Detecting of a stalking operation by the surveillance system 105 and/or the cloud computer 145, in scenarios such as the example scenarios described above, can include various actions that may be carried out by the individual 125. Some example actions can involve the individual 125 configuring the surveillance system 105 (via a software application in the personal device 130, for example) to carry out a surveillance operation over a specified duration of time (for example, 2 hours, 3 hours, etc.) at specified times (for example, 8 AM, 5 PM, every weekday, etc.) and over a specified period (for example, a month, or a year); to carry out a surveillance operation by using a geofence (such as the geofence 240, for example); to carry out a surveillance operation based on specified trip origination location and/or trip destination locations; and to discard results of a surveillance operation after a specified period of time (for example, two months, a year, etc.) - particularly when the surveillance operation fails to detect stalking.

The individual 125 may also be provided an option (via a software application in the personal device 130, for example) to initiate a surveillance operation ahead of time before entering a vehicle, and/or to continue the surveillance operation after exiting the vehicle at a destination. Initiating the surveillance operation ahead of time before starting a trip may, in certain cases, lead to detecting a stalker, thereby allowing the individual 125 to take evasive action such as, for example, use a different vehicle or travel at a different time. Extending the surveillance operation after exiting the vehicle may, provide peace of mind to the individual 125 while walking to an office, for example, or while waiting to rendezvous with a friendly entity (family member, friend, colleague, etc.).

Figure 8:
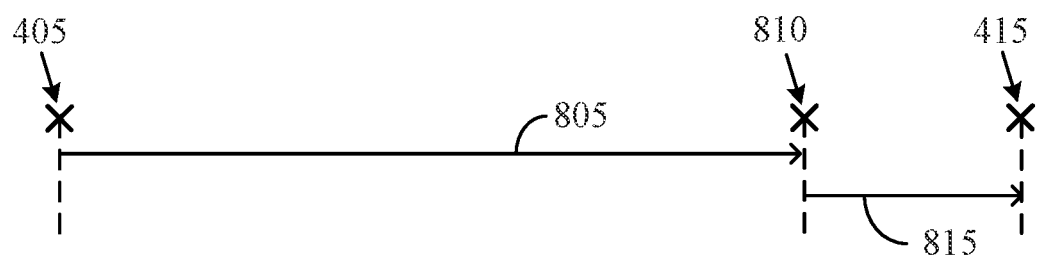
FIG. 8 illustrates a first example evasive action that an individual may execute in order to evade a stalker in accordance with tan embodiment of the disclosure.

FIG. 8 illustrates a first example evasive action that an individual may execute in order to evade a stalker in accordance with an embodiment of the disclosure. In this example scenario, the individual 125 may travel in a first vehicle (an autonomous ride share vehicle, for example) from the origination spot 405 (along a travel route indicated by a solid line 805) to an intermediate spot 810 before exiting the first vehicle and traveling to the destination spot 415 in a second vehicle (travel route indicated by a solid line 815). Such an action may prevent, or at least hamper, a stalker from stalking the individual 125.

Figure 9:
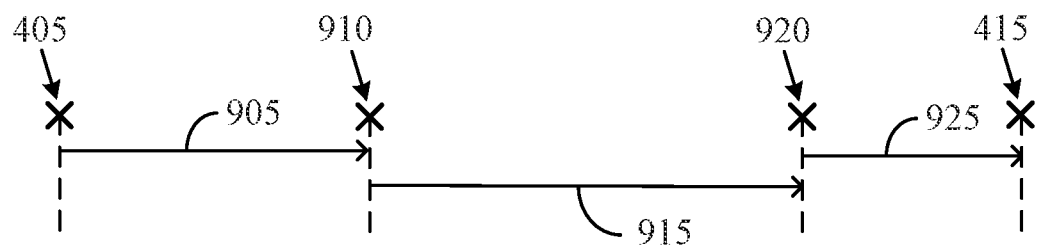
FIG. 9 illustrates a second example evasive action that an individual may execute in order to evade a stalker in accordance with tan embodiment of the disclosure.

FIG. 9 illustrates a second example evasive action that an individual may execute in order to evade a stalker in accordance with an embodiment of the disclosure. In this example scenario, the individual 125 may break travel twice to switch vehicles at a first intermediate spot 910 and a second intermediate spot 920 along a travel route from the origination spot 405 to the destination spot 415. A first travel segment of the travel route is indicated by a solid line 905, a second travel segment of the travel route is indicated by a solid line 915, and a third travel segment of the travel route is indicated by a solid line 925.

Figure 10:
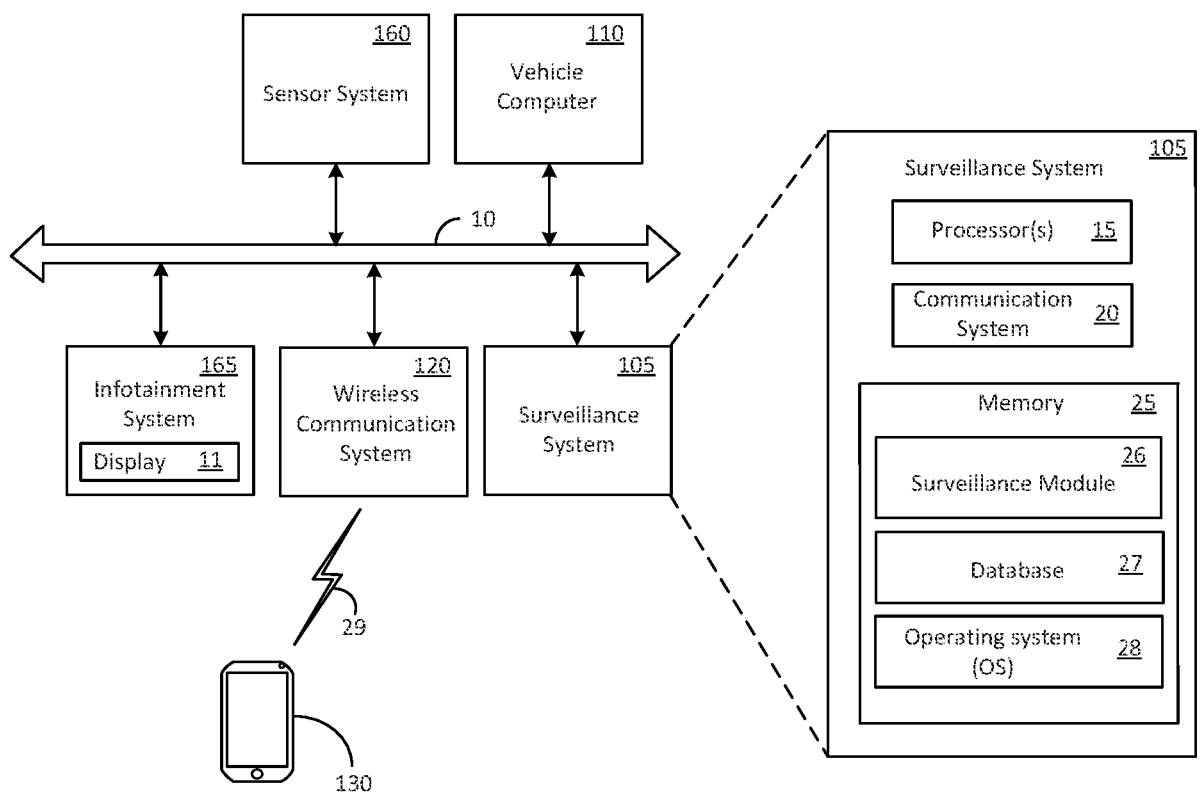
FIG. 10 illustrates some example components that can be included in a vehicle in accordance with the disclosure.

FIG. 10 shows some example components that may be included in the vehicle 115 in accordance with an embodiment of the disclosure. The example components can include the sensor system 160, the vehicle computer 110, the infotainment system 165, the wireless communication system 120, and the surveillance system 105.

The various components are communicatively coupled to each other via one or more buses, such as a bus 10 that can be implemented using various wired and/or wireless technologies. For example, the bus 10 can be a vehicle bus that uses a controller area network (CAN) bus protocol, a Media Oriented Systems Transport (MOST) bus protocol, and/or a CAN flexible data (CAN-FD) bus protocol. Some or all portions of the bus 10 may also be implemented using wireless technologies such as Bluetooth®, Ultra-Wideband, Wi-Fi, Zigbee®, or near-field-communications (NFC).

In an example implementation, the personal device 130 is coupled to the wireless communication system 120 via a wireless link 29 that can carry information in various communication formats such as, for example, Bluetooth®, Ultra-Wideband, Wi-Fi, Zigbee®, and/or NFC. The use of a Bluetooth® link can provide a certain level of convenience when the personal device 130 is a smartphone, for example. In another example implementation, the personal device 130 is coupled directly to the bus 10 for communicating with the surveillance system 105. The direct coupling to the bus 10 may be carried out by use of a USB cable, for example. Tethering the personal device 130 to the bus 10 via a wired medium such as the USB cable provides a level of security that may be higher than obtainable through a wireless connection.

The infotainment system 165 can include a display 11 that is used for displaying various items associated with surveillance operations in accordance with the disclosure such as, for example, advice to the individual 125. The display 11 can include a GUI that may be used by the individual 125 for various purposes such as, for example, to enter a request for execution of a surveillance procedure.

The wireless communication system 120 can include a wireless transceiver that allows the surveillance system 105 to communicate with various devices such as the personal device 130, the cloud computer 145, the server computer 155, the computer 216 in the vehicle 215, and/or the computer 231 in the police station 230. The wireless transceiver may use any of various communication formats such as, for example, vehicle-to-vehicle (V2V) communication format, a vehicle-to-everything (V2X) communication format, a infrastructure-to-vehicle (I2V) communication format, an Internet communications format, or a cellular communications format for communicating with the personal device 130, the cloud computer 145, the server computer 155, the computer 216 in the vehicle 215, and/or the computer 231 in the police station 230.

The wireless transceiver may also use one or more of various wireless technologies such as Bluetooth®, Ultra-Wideband (UWB), Wi-Fi, ZigBee®, Li-Fi (light-based communication), audible communication, ultrasonic communication, or near-field-communications (NFC), for carrying out wireless communications with devices such as the personal device 130 of the individual 125 and/or the infotainment system 165 of the vehicle 115.

In an example implementation, some or all parts of the surveillance system 105 can be integrated into the vehicle computer 110. The surveillance system 105 can include a processor 15, a communication system 20, and a memory 25. The communication system 20 may cooperate with the wireless communication system 120 for transferring information to/from various devices such as, for example, the cloud computer 145.

The memory 25, which is one example of a non-transitory computer-readable medium, may be used to store an operating system (OS) 28, a database 27, and various code modules such as a surveillance module 26. The code modules are provided in the form of computer-executable instructions that can be executed by the processor 15 for performing various operations in accordance with the disclosure. For example, the surveillance module 26 can be executed by the processor 15 for performing various operations in accordance with the disclosure. The operations are generally directed at detecting a stalking operation targeting an occupant of a vehicle.

In an example implementation, the surveillance module 26 is a software application that may be downloaded into the surveillance system 105 and executed by the individual 125 upon entry into the vehicle 115. The processor 15 may execute the surveillance module 26 for cooperating with another software application such as, for example, a software application provided by a ride-hail company (Uber®, Lyft® etc.) in order to obtain information about the individual 225. The information, which can include a travel history of the individual 225, may be evaluated by the processor 15 to identify a travel pattern of the individual 225.

The database 27 may be used to store various types of data that can be used by the surveillance module 26. For example, the database 27 may be used to store information about the individual 125 and the individual 225 such as, for example, a travel history of one or both individuals.

Figure 11:
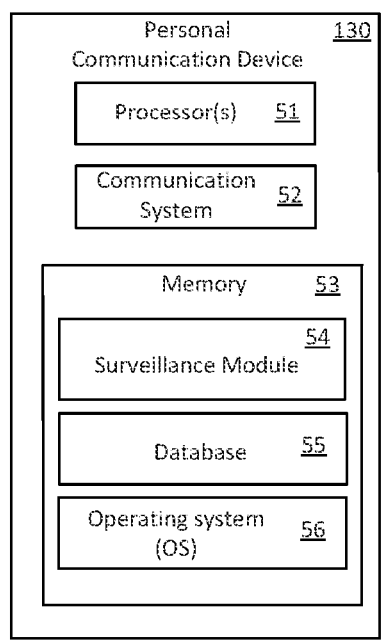
FIG. 11 illustrates some example components that can be included in a personal device in accordance with the disclosure

FIG. 11 shows some example components that may be included in the personal device 130 of the individual 125 in accordance with an embodiment of the disclosure. The personal device 130 can include a processor 51, a communication system 52, and a memory 53. The communication system 52 may be configured to wirelessly communicate with the wireless communication system 120 for transferring information to/from the surveillance system 105 in the vehicle 115.

The memory 53, which is another example of a non-transitory computer-readable medium, may be used to store an operating system (OS) 56, a database 55, and various code modules such as a surveillance module 54. The code modules are provided in the form of computer-executable instructions that can be executed by the processor 51 for performing various operations in accordance with the disclosure. For example, the surveillance module 54 can be executed by the processor 51 for performing various operations in accordance with the disclosure. The operations are generally directed at detecting a stalking operation targeting the individual 125 who carries the personal device 130.

In an example implementation, the surveillance module 54 is a software application that may be downloaded into the personal device 130 and launched by the individual 125 either when outside or inside the vehicle 115. In one implementation, the processor 51 may execute the surveillance module 54 for cooperating with another software application such as, for example, a software application provided by a ride-hail company (Uber®, Lyft® etc.) in order to obtain information about the individual 225. The information, which can include a travel history of the individual 225, may be evaluated by the processor 51 to identify a travel pattern of the individual 225. In another implementation, the processor 51 may execute the surveillance module 54 for cooperating with the surveillance system 105, which carries out the surveillance procedure (including, for example, obtaining ride share information of the individual 225 who may be stalking the individual 125).

The database 55 may be used to store various types of data that can be used by the surveillance module 54. For example, the database 55 may be used to store information about the individual 125 such as, for example, a travel history of the individual 125. The travel history of the individual 125 may be made available to the surveillance system 105 in the vehicle 115 for purposes such as comparing against a travel history of the individual 225 for detecting a stalking operation.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," or "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 25 and the memory 53, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not in function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
receiving, from a first individual traveling in a first connected vehicle, a request to perform a surveillance operation;
responding to the request by obtaining data from a first computer located in the first connected vehicle and/or a second computer located in a second vehicle;
detecting, based on the data, a travel pattern of a second individual traveling in one of the first connected vehicle or the second vehicle;
determining, based on the travel pattern of the second individual, whether the second individual is stalking the first individual; and
transmitting, to the first individual and based on the travel pattern, a finding whether the second individual is stalking the first individual,
wherein the first connected vehicle is a first autonomous vehicle and the second vehicle is a second autonomous vehicle, and wherein the finding informs the first individual that the second individual is stalking the first individual, the method further comprising:
providing, by the first individual, an instruction to place the second individual on one of a friends list or a family list and to desist from performing the surveillance operation upon the second individual.

2. The method of claim 1, wherein the request is received in a personal device of the first individual and wherein evaluating the travel pattern of the second individual is executed by the personal device and/or a cloud computer based on the data obtained from the first computer located in the first connected vehicle and/or the second computer located in the second vehicle.

3. The method of claim 2, wherein the second individual is traveling in the second vehicle, and wherein evaluating the travel pattern of the second individual comprises comparing at least a portion of a first travel route of the first connected vehicle to a second travel route of the second vehicle.

4. The method of claim 3, wherein the second travel route mirrors the first travel route on more than one occasion.

5. The method of claim 1, wherein the finding informs the first individual that the second individual is conducting a stalking operation upon the first individual, and the method further comprises:
transmitting an advisory advising the first individual to execute an evasive action to counter the stalking operation.

6. The method of claim 5, wherein the first connected vehicle is a first autonomous vehicle and the second vehicle is a second autonomous vehicle, and wherein the evasive action comprises switching from a first ride share service provider to a second ride share service provider, modifying a travel route, modifying a travel time, using multiple transport vehicles to complete a trip, and/or discontinuing the trip.

7. A method comprising:
submitting, by a first individual in a first connected vehicle, a request to perform a surveillance operation over a first period of time, the surveillance operation directed at determining whether a second individual traveling in one of the first connected vehicle or in a second vehicle over the first period of time is stalking the first individual, wherein submitting the request to perform the surveillance operation comprises:
entering the request into a personal device of the first individual; and
transmitting the request from the personal device to a cloud computer;
receiving a result of the surveillance operation based on evaluating a travel pattern of the second individual traveling in the one of the first connected vehicle or in the second vehicle over the first period of time,
evaluating, by the cloud computer, the travel pattern of the second individual traveling in the one of the first connected vehicle or in the second vehicle over the first period of time;
detecting, by the cloud computer, a stalking operation in the travel pattern of the second individual; and
transmitting, by the cloud computer, to the personal device, based on detecting the stalking operation, an alert to inform the first individual that the second individual is stalking the first individual,
wherein the first connected vehicle is a first autonomous vehicle and the second vehicle is a second autonomous vehicle, and wherein evaluating the travel pattern of the second individual comprises evaluating data received by the cloud computer from a first computer located in the first autonomous vehicle and/or a second computer located in the second autonomous vehicle, the data comprising a travel history of the second individual in the first autonomous vehicle and/or in the second autonomous vehicle.

8. The method of claim 7, further comprising:
transmitting, by the personal device to the cloud computer, an instruction to place the second individual on one of a friends list or a family list and desist from performing the surveillance operation upon the second individual.

9. The method of claim 7, further comprising:
transmitting, by the cloud computer, to the personal device an advisory advising the first individual to execute an evasive action to counter the stalking operation.

10. The method of claim 9, wherein the first period of time extends from an origination spot of a ride to a destination spot of the ride in the first autonomous vehicle, and wherein the evasive action comprises switching from a first ride share service provider to a second ride share service provider, modifying a travel route, and/or modifying a travel time.

11. A method comprising:
receiving, from a first individual traveling in a first connected vehicle, a request to perform a surveillance operation;
responding to the request by obtaining data from a first computer located in the first connected vehicle and/or a second computer located in a second vehicle;
detecting, based on the data, a travel pattern of a second individual traveling in one of the first connected vehicle or the second vehicle;
determining, based on the travel pattern of the second individual, whether the second individual is stalking the first individual; and
transmitting, to the first individual and based on the travel pattern, a finding whether the second individual is stalking the first individual,
wherein the finding informs the first individual that the second individual is conducting a stalking operation upon the first individual, and the method further comprises transmitting an advisory advising the first individual to execute an evasive action to counter the stalking operation, and
wherein the first connected vehicle is a first autonomous vehicle and the second vehicle is a second autonomous vehicle, and wherein the evasive action comprises switching from a first ride share service provider to a second ride share service provider, modifying a travel route, modifying a travel time, using multiple transport vehicles to complete a trip, and/or discontinuing the trip.

* * * * *